US009430777B1

(12) United States Patent
Strand

(10) Patent No.: US 9,430,777 B1
(45) Date of Patent: Aug. 30, 2016

(54) INCENTIVE GENERATOR FOR SHIPPING EFFICIENCY

(75) Inventor: William Alexander Strand, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 745 days.

(21) Appl. No.: 12/858,914

(22) Filed: Aug. 18, 2010

(51) Int. Cl.
*G06Q 30/00* (2012.01)
*G06Q 30/02* (2012.01)

(52) U.S. Cl.
CPC .................. *G06Q 30/0207* (2013.01)

(58) Field of Classification Search
CPC ........... G06Q 30/207; G06Q 30/0251; G06Q 30/0207
USPC ......................................................... 705/14
See application file for complete search history.

(56) References Cited

U.S. PATENT DOCUMENTS

| | | | |
|---|---|---|---|
| 5,960,411 A | 9/1999 | Hartman et al. | |
| 7,720,720 B1 | 5/2010 | Sharma et al. | |
| 7,813,970 B1 | 10/2010 | Brandwine et al. | |
| 7,917,400 B1 | 3/2011 | Brandwine et al. | |
| 8,117,079 B1 | 2/2012 | Brandwine et al. | |
| 8,117,082 B1 | 2/2012 | Brandwine et al. | |
| 8,170,923 B1 | 5/2012 | Brandwine et al. | |
| 8,306,837 B2 * | 11/2012 | Eager | 705/7.11 |
| 8,364,551 B1 | 1/2013 | Vippagunta | |
| 8,768,763 B2 * | 7/2014 | Horvitz et al. | 705/14.23 |
| 2002/0107820 A1 * | 8/2002 | Huxter | 705/402 |
| 2003/0126595 A1 * | 7/2003 | Sie et al. | 725/29 |
| 2004/0068443 A1 * | 4/2004 | Hopson et al. | 705/26 |
| 2004/0193470 A1 * | 9/2004 | Nemoto et al. | 705/8 |
| 2005/0102181 A1 * | 5/2005 | Scroggie et al. | 705/14 |
| 2006/0041481 A1 * | 2/2006 | Stowe | 705/16 |
| 2006/0282321 A1 * | 12/2006 | Schiedel et al. | 705/14 |
| 2009/0094078 A1 * | 4/2009 | Kaehne | 705/7 |
| 2009/0210313 A1 * | 8/2009 | Winebrake et al. | 705/26 |
| 2010/0100402 A1 | 4/2010 | Shah et al. | |
| 2010/0125494 A1 * | 5/2010 | Boss et al. | 705/14.19 |
| 2010/0274609 A1 * | 10/2010 | Shoemaker et al. | 705/8 |

OTHER PUBLICATIONS

U.S. Appl. No. 12/939,845, filed Nov. 4, 2010 entitled "Environmentally Conscious Electronic Commerce Background".

* cited by examiner

*Primary Examiner* — Matthew L Hamilton
(74) *Attorney, Agent, or Firm* — Thomas | Horstemeyer, LLP

(57) ABSTRACT

Disclosed are various embodiments for generating incentives for users accessing an electronic commerce system that maximizes shipping consolidation for a merchant in the electronic commerce system. An incentive generator determines the shipping address for a user on the electronic commerce system. The incentive generator identifies at least one previously scheduled order to destinations located within a predefined area relative to the user shipping address. The incentive generator gathers the target delivery dates of identified previously scheduled deliveries and generates at least one incentive for the user to select a delivery date substantially similar to the target delivery dates. The at least one incentive is based at least in part on the destination of the previously scheduled order, a target delivery date of the previously scheduled order, and a shipping capacity threshold.

22 Claims, 7 Drawing Sheets

INCENTIVE GENERATOR FOR SHIPPING EFFICIENCY

BACKGROUND

Merchants who sell products over the Internet may often have customers located in the same localities that purchase items in the same time frame. Unfortunately, the items are typically shipped to such customers at different times, thereby resulting in inefficiency and greater resources used to transport items.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to generating incentives for a customer in an electronic commerce system to select a specific delivery date of a purchased product that both maximizes shipping efficiency and simultaneously promotes sales. In the following discussion, a general description of the system and its components is provided, followed by a discussion of the operation of the same.

Figure 1:
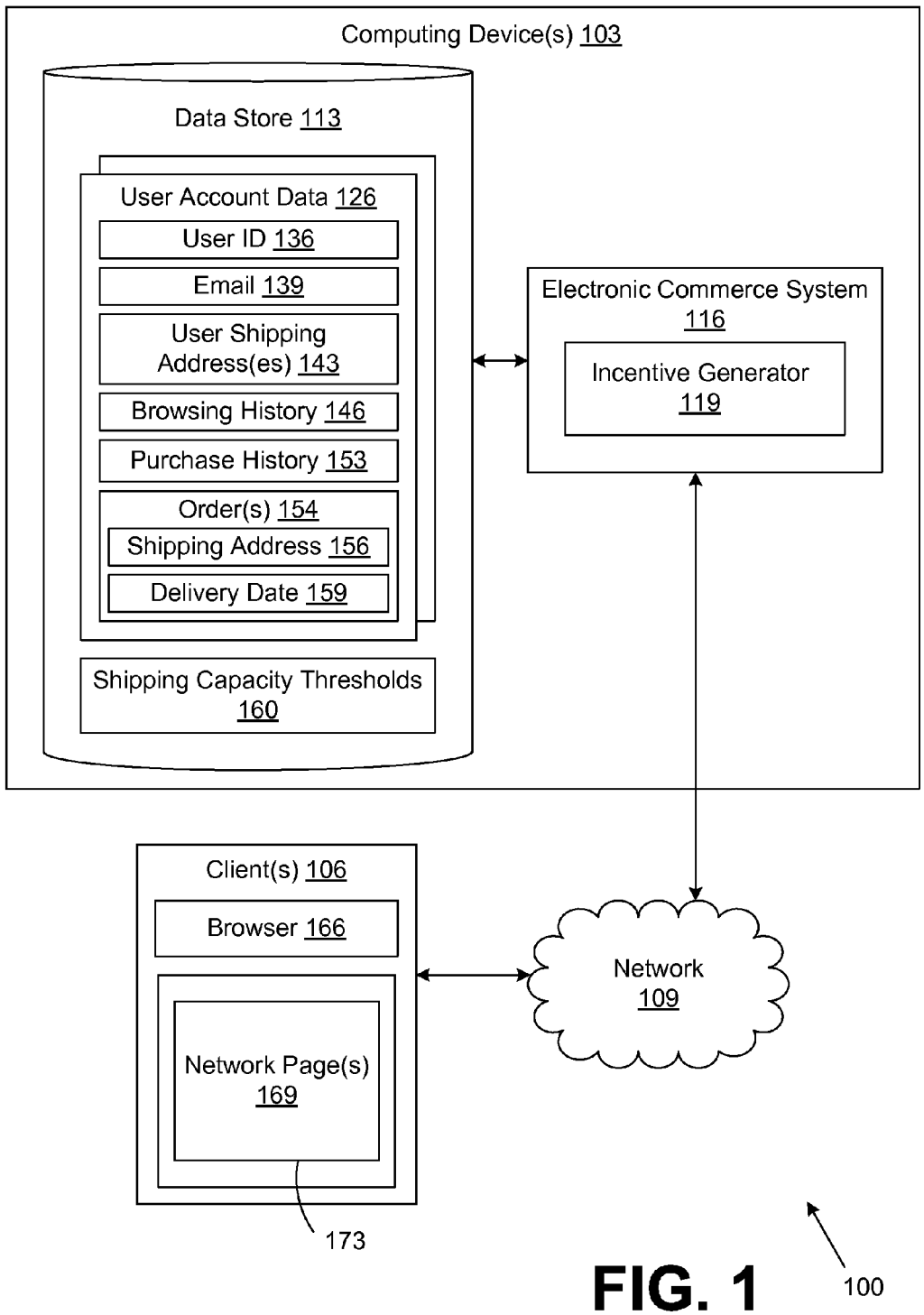
FIG. 1 is a drawing of a networked environment according to various embodiments of the present disclosure.

With reference to FIG. 1, shown is a networked environment 100 according to various embodiments. The networked environment 100 includes a computing device 103, a client device 106 and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores as can be appreciated. The data stored in the data store 113, for example, is associated with the operation of the various applications and/or functional entities described below.

The components executed on the computing device 103, for example, include electronic commerce system 116, and other applications, services, processes, systems, engines, or functionality not discussed in detail herein. The electronic commerce system 116 includes various components such as an incentive generator 119, and other applications and processes.

The electronic commerce system 116 is executed in order to facilitate the online purchase of products over the network 109. The electronic commerce system 116 also performs various back-end functions associated with the online presence of a merchant in order to facilitate the online purchase of products. For example, the electronic commerce system 116 generates network pages 169 such as web pages or other types of network content that are provided to clients 106 for the purposes of selecting products for purchase, rental, download, lease, or other form of consumption as will be described. Additionally, the incentive generator 119 is configured to generate incentives for the customer to promote purchase of one or more products while simultaneously maximizing shipping efficiency. For example, the incentives include item discounts, item giveaways, adding related or unrelated services, service discounts, bundling the item with related or unrelated items and shipping discounts such as supersaver discounts and/or clustered shipping discounts.

The data stored in the data store 113 includes, for example, user account data 126 that is maintained for each one of a plurality of customers, shipping capacity thresholds 160, and potentially other data. The user account data 126 for a given user includes a user identifier (ID) 136, an email address 139, one or more user shipping addresses 143, a browsing history 146 of the user, a purchase history 153 of the user, and one or more current orders 154 for items purchased by a user. Associated with each of the orders 154 are a shipping address 156, a target delivery date 159, and other information such as payment instruments used for the order 154, items subject to the order 154, and other information. Each of the shipping capacity thresholds 160 indicates a predefined shipping capacity in terms of weight, volume, or both weight and volume that may be specified by a carrier, for example, to provide reduced or bulk shipment rates or discounts for transportation of those items. Each of the shipping capacity thresholds 160 may be represented in terms of pounds, kilograms, cubic feet, and/or any other form of measuring weight and/or volume. In one embodiment, the shipping capacity thresholds 160 are values that are received from at least one transportation entity or carrier, although a merchant may act as their own carrier in some situations.

In one embodiment, the user ID 136 represents a unique user ID used by the electronic commerce system 116. The email address 139 represents an email address associated with the user ID 136. The user shipping addresses 143 are the addresses that a user may specify as the shipping address 156 for respective orders 154. The browsing history 146 represents the browsing history of the customer in the electronic commerce system 116. In one embodiment, the browsing history 146 may contain a list of network pages such as web pages viewed by a respective user or items examined by a user, a number of web page views of a particular item by the user, and/or other aspects of the customer's browsing history (e.g., mouseovers). Additionally, the purchase history 153 includes a listing of the past purchases, rentals, downloads, etc. made by a customer in the electronic commerce system 116. For instance, the purchase history 153 may include names of items purchased by the customer in the electronic commerce system 116, payment information for the purchased products, and/or other aspects of the customer's purchasing history.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as a browser 166 and/or other applications. The browser 166 may be executed in a client 106, for example, to access and render network page(s) 169 on a display screen 173, such as web pages, or other network content served up by the electronic commerce system 116. The client 106 may be configured to execute applications beyond browser 166 and client side application 163 such as, for example, email applications, instant message applications, and/or other applications.

Next, a general description of the operation of the various components of the networked environment 100 is provided. To begin, a user interacts with the electronic commerce system 116 on the client 106 via the network 109 to shop and/or browse for a plurality of products to make a purchase. In one embodiment, the user interacts with the electronic commerce system 116 using the browser 166 on client 106. On the initial access, the electronic commerce system 116 requires the user on the client 106 to register an account by specifying the user ID 136 and other information about the user such as the email address 139 and/or other information as mentioned above. In one embodiment, the user may enter one or more shipping addresses 143 such as, for instance, a home address, an office address, a son's address, a daughter's address, and/or other addresses. Alternatively, the shipping address(es) 143 associated with a user account data 126 may be specified during one or more checkout processes as the user makes at least the first initial purchase of items through the electronic commerce system 116.

In one embodiment, a shipping address 143 may be automatically determined based on the user's geographic location and/or be manually inputted by the user on the client 106. For example, the user may indicate that the shipping address 143 is the user's home address, work address, and/or any other shipping address for delivery of any items purchased in the electronic commerce system 116. In particular, the user may be allowed to provide multiple shipping addresses indicating a plurality of places where the user may accept item deliveries. In another embodiment, the user may be required to provide additional identifying information such as, for instance, payment information, billing address, telephone number and/or any other type of identifying information.

Upon registering with the electronic commerce system 116, the user may purchase and/or rent items freely where orders 154 are generated over time. As orders 154 are fulfilled, the information about such orders 154 is then stored as part of the purchase history 153 of the user.

From time to time, a user may be browsing through various items offered for sale and/or rent through the electronic commerce system 116. As the user views various items, the electronic commerce system 116 may generate recommendations for other similar items that are presented to the user in various network pages. For instance, the electronic commerce system 116 may generate item recommendations based on the user's browsing history 146, purchase history 153, and/or other method. Alternatively, the user may select items to purchase and may be in the middle of the checkout process at a point where the user is required to select a shipping mode to have the item shipped to a respective shipping address.

In any of the above situations, according to one embodiment, the incentive generator 119 is configured to examine all of the current orders 154 for items for all users that are to be shipped to addresses located within a predefined area relative to at least one of the user shipping address(es) 143. The incentive generator 119 identifies a number of potential shipping dates for an item being purchased, an item being presented as a recommendation, and/or an item viewed in some other context that would result in the most significant consolidation of shipping.

That is to say, that if a plurality of items are destined for a single area such as an area defined by a given zip code, municipality, predefined geographical limitation, or other area, then the incentive generator 119 is configured to identify all of the orders 154 from multiple customers scheduled to make a delivery to a location within the given defined area given the target delivery dates 159 associated with the respective orders 154. In one embodiment, the area may be defined as having a predefined radius around the user shipping address 143 or the area may be defined in some other manner. Further, this approach may be repeated for all of the user shipping address(es) 143, such as, for instance, the work address, the son's address, the daughter's address, and/or any other alternative address. Given that the items are to be shipped to a specified area on a given day, the incentive generator 119 may determine a degree of consolidation for each target delivery date 159 that can occur for shipping of all items to the respective area if the items currently presented or subject to purchase were to be shipped on the target delivery date 159 along with the other items already slated to be shipped on that day. Multiple days may be examined and consolidation can be determined for each day.

The degree of consolidation that may be obtained on a given target deliver date 159 for a given area may be determined, for example, in terms of a shipping capacity that is compared with the respective shipping capacity thresholds 160. For instance, a shipping capacity may be defined by a total weight or shipping volume of the items to be delivered to the area on the given date. Each shipping capacity threshold 160 may be some predefined minimum value of the total weight and/or total shipping volume of the items to be delivered, or some combination of weight and volume, as discussed above.

In one embodiment, the shipping capacity thresholds 160 are given to the merchant by one or more transportation entities. In some cases, a given shipping capacity threshold 160 may comprise the number of items that will fully load a delivery vehicle such as a truck. Given that shippers will want to consolidate shipments on respective delivery vehicles that are filled to capacity for maximum efficiency, when such shipping capacity thresholds 160 are reached, a carrier or shipper may provide bulk shipping discounts to the merchant who sells items through the electronic commerce system 116 to encourage such shipping consolidation. In one embodiment, such delivery discounts may be passed on to the user in terms of incentives that result in such consolidation. Specifically, a merchant may provide incentives, for example, shipping discounts, in an attempt to persuade users within a defined area to select at least one preferred day on which items may be shipped to provide for greater consolidation. Effectively, the merchant may use the shipping discounts provided by a carrier to induce customers to specify shipping dates that maximize consolidation and therefore maximize efficiency. Specifically, more delivery vehicles are filled to capacity which ultimately results in lower fuel usage, thereby benefiting the environment by lowering greenhouse gas emissions, etc.

Thus, having identified at least one order 154 to a shipping address 156 that is located within a predefined area relative to at least one of the user shipping address(es) 143, the incentive generator 119 generates incentives for the user to place a purchase order for at least one item that will be delivered to the user shipping address 143 on one or more preferred dates. In one embodiment, the preferred dates maximize shipping consolidation and/or shipping efficiency for the electronic commerce system 116 (for one or more shipping carriers designated by the system). Where multiple shipping days are presented, the incentive may vary from one potential shipping date to another given the degree of consolidation for each date that results in differing shipping discounts.

As mentioned above, the incentives generated by the incentive generator 119 are based at least in part on the shipping address 156 and the target delivery date 159 for an order 154, and/or other factors. In one embodiment, the incentive generator 119 analyzes the target delivery date 159 of the identified order(s) 154 to generate an incentive to prompt the user to select a delivery of the item on the same target delivery date 159, thereby achieving greater consolidation. For example, assume the target delivery dates 159 of several items being shipped to a given area are scheduled to occur within a four day period. To promote the user to place an order, the incentive generator 119 may offer the user a shipping discount if the user schedules delivery of a new order to occur within one of the four days, thus achieving greater shipping consolidation of multiple orders 154 for multiple customers.

In a further embodiment, the incentive generator 119 may identify two or more order(s) 154a/154b having shipping addresses 156a/156b that are both located within a predefined area relative to at least one of the user shipping address(es) 143. However, the target delivery dates 159a/159b may not be the same. In this embodiment, the incentive generator 119 generates incentives based on the difference in the target delivery dates 153a/153b, and/or other factors. For instance, target delivery date 159a may be three days earlier than target delivery date159b. The incentive generator 119 may generate incentives for delivery of the item for a plurality of dates but may provide the most incentive for the user to select either target delivery date 159a or delivery 159b. For example, the incentive generator 119 may provide a higher item discount, a higher shipping discount, more valuable item giveaways, free gift wrapping, and/or other types of incentive to promote the user to schedule an order having target delivery date 159a/159b. In one embodiment, the item giveaways may be determined based on a pattern of purchasing behavior associated with the user's purchase history 153. Moreover, in one embodiment, the incentives may be the same for selecting either target delivery date 159a or 159b.

In yet another embodiment, the incentive generator 119 may identify two or more orders 154 to shipping addresses 156 that are located within a predefined area relative to at least one of the user shipping address(es) 143 where the shipping address156a for the first order 154a may be at substantially the same geographical location as the user shipping address 143 and the shipping address 156b for the second order 154b may be to a location further away from the user shipping address 143. Further in this embodiment, the target delivery dates 159a/159b may not be substantially the same. The incentive generator 119 then generates incentives based at least in part on analyzing the shipping address 156a/156b of the orders 154a/154b.

For instance, the target delivery date 159a of the order 154a may occur later in time than the target delivery date 159b of the order 154b. In this example, the user may prefer an earlier delivery date. However, the electronic commerce system 116 may save more resources, such as, for instance, shipping time and/or shipping costs, by scheduling the delivery to user shipping address 143 along with the order 154a even though it has a later occurring target delivery date 159a. To promote the user to select the later delivery date 159a, the incentive generator 119 may provide higher discounts for the later delivery date 159a. For example, the incentive may comprise a higher item discount, higher shipping discount, a more valuable item giveaway, and/or other types of incentives. In one embodiment, the electronic commerce system 116 may also provide information to the user that communicates the amount of natural resources saved in opting for the later delivery date 159a such as, for instance, unused gasoline, avoided pollution, reduced carbon footprint, and/or other savings in natural resources.

In still another embodiment, from time to time it may be the case that multiple orders 154 associated with users in a given defined area are to be delivered on several different days, resulting in a lower degree of consolidation on each of the respective days. It may be possible to send email messages to such users offering incentives relating to their current pending orders that induce such users to change a specified delivery date so that greater consolidation could be achieved. Such incentives may comprise, for example, a post purchase credit or other incentive as mentioned above.

Figure 2:
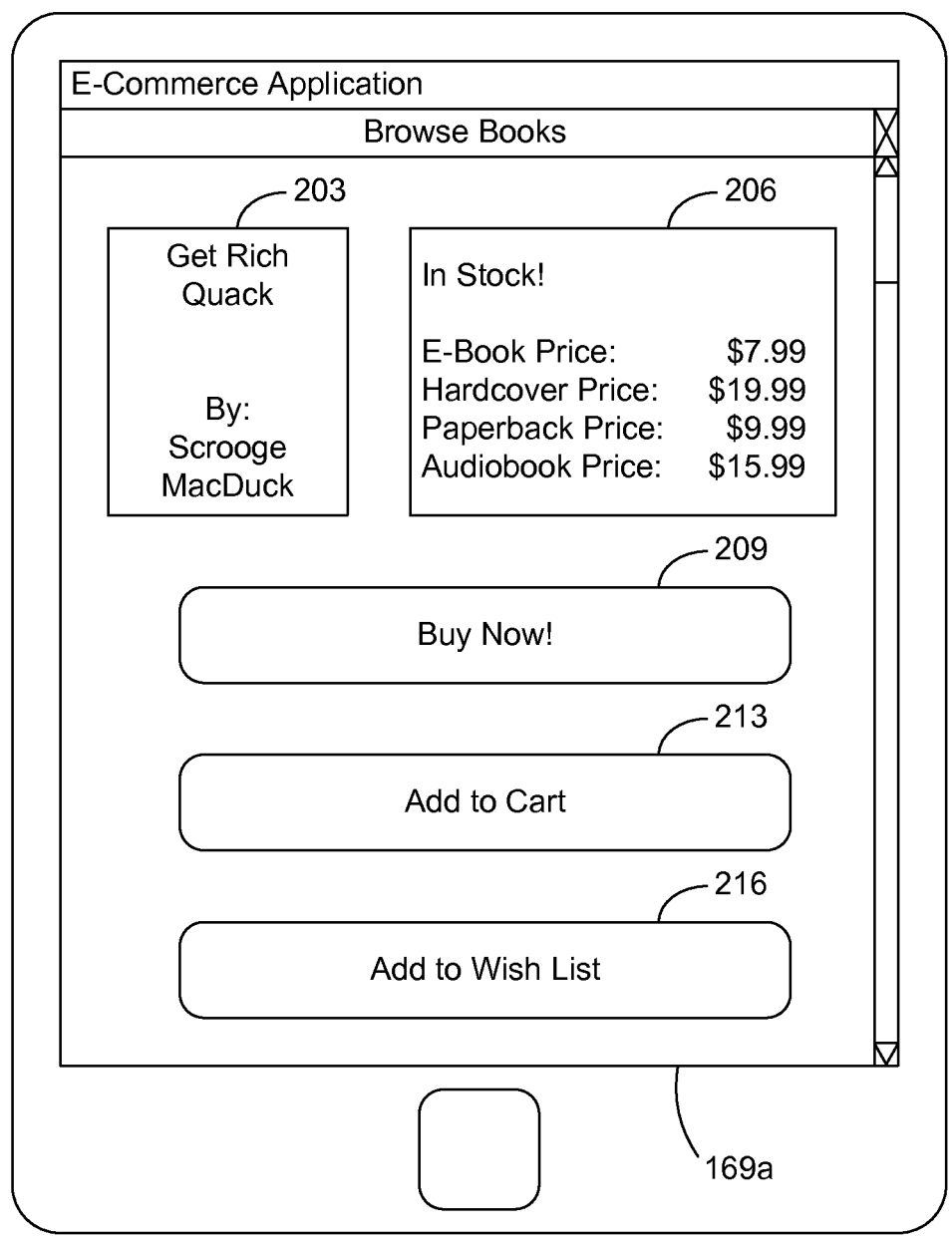
FIGS. 2, 3, and 4 are drawings of an example of a user interface rendered by a client in the networked environment of FIG. 1 according to various embodiments of the present disclosure.
Figure 3:
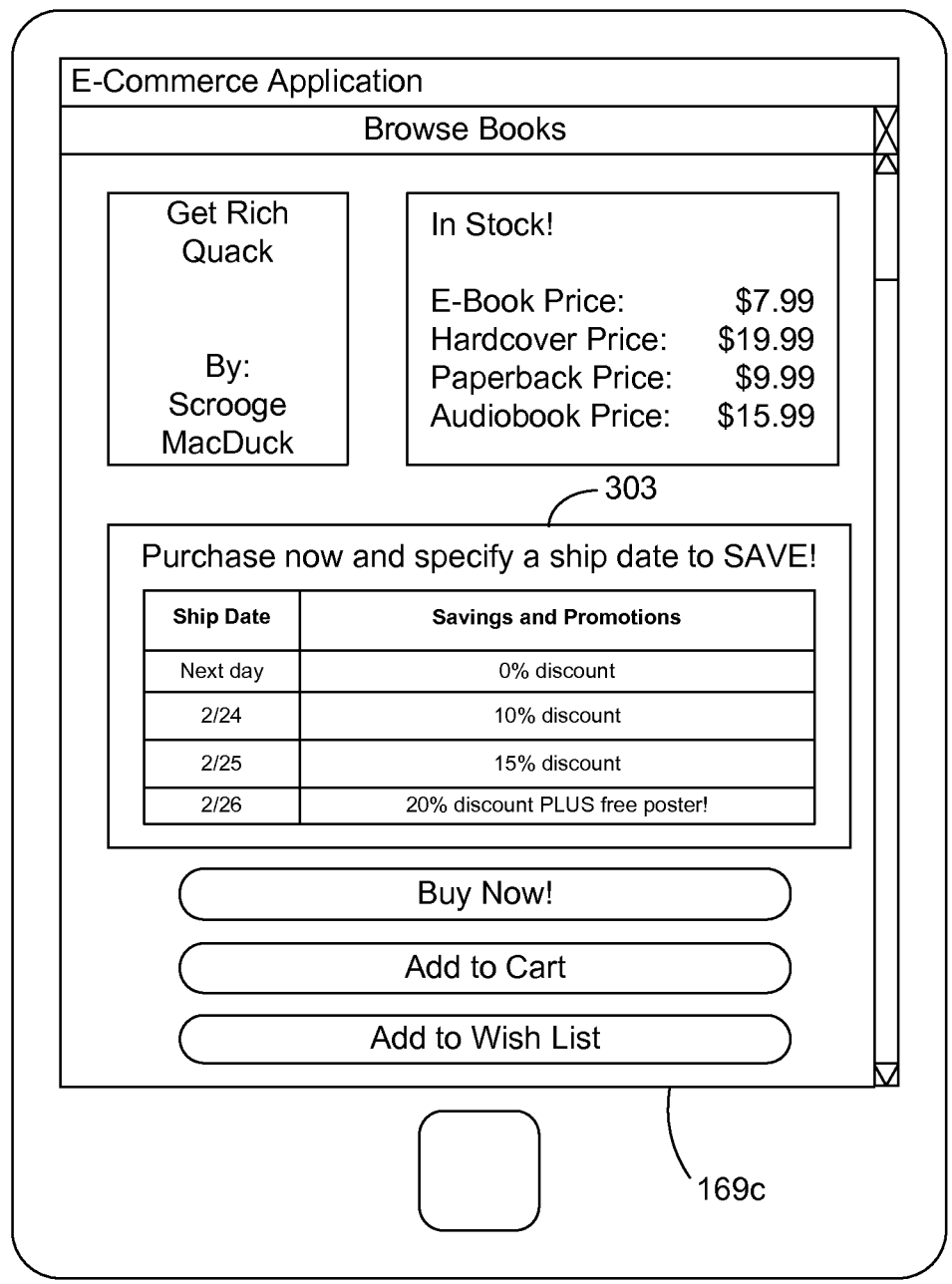
Figure 4:
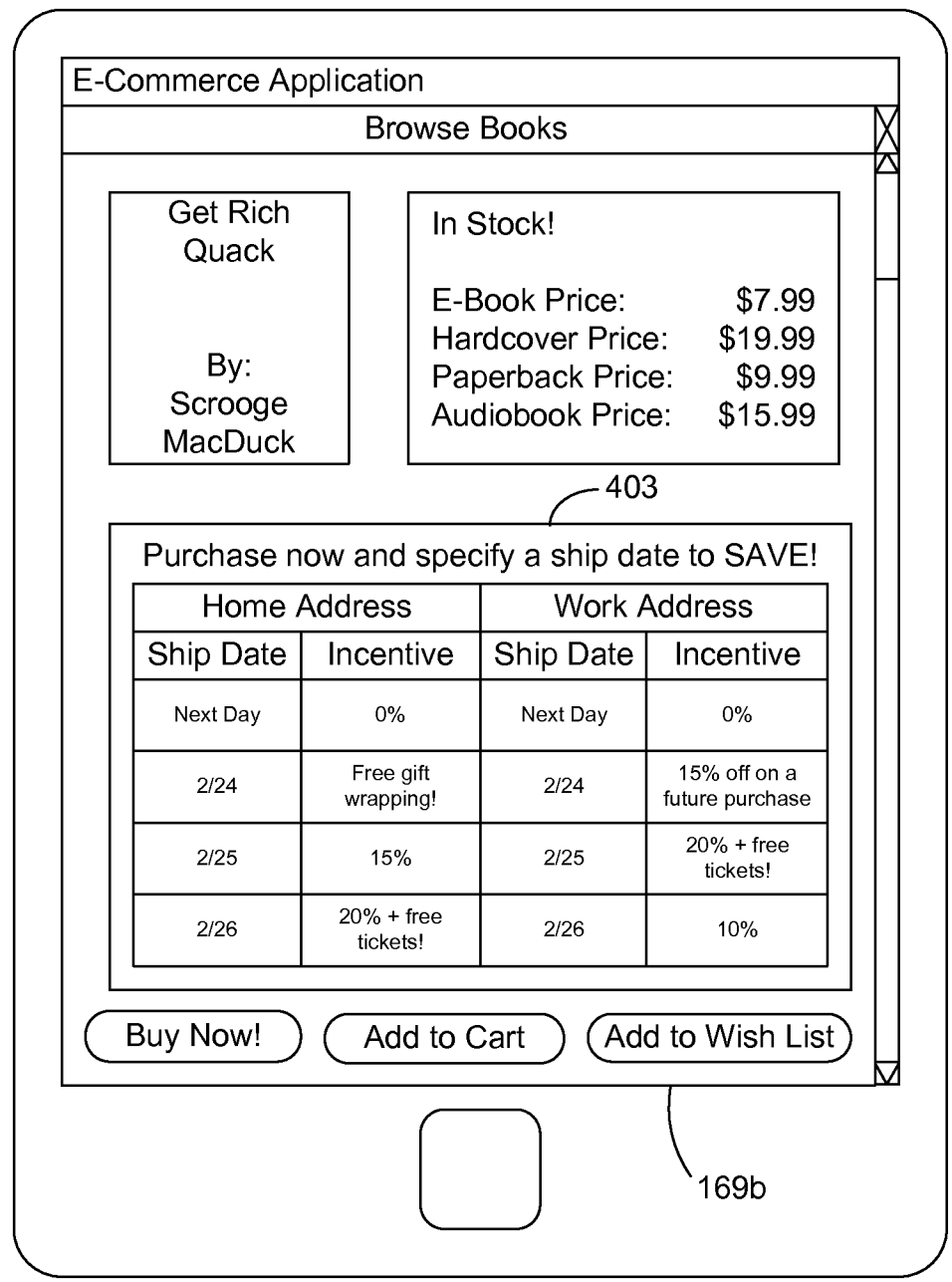

Referring next to FIGS. 2-4, shown are examples of rendered network pages 169 according to various embodiments of the present disclosure. The various graphical components such as push buttons and the like shown in FIGS. 2-4 are merely examples of the various types of components that may be used to accomplish the specific functions noted.

Beginning with FIG. 2, shown is an example of a network page 169 (FIG. 1), denoted herein as network page 169a, that may be viewed on client 106 (FIG. 1) according to various embodiments. In one embodiment, the network page 169a may include an item box 203, a price box 206, a buy button 209, a cart button 213 and a wish list button 216. The item box 203 displays an item that is offered for purchase by the electronic commerce system 116 (FIG. 1). For instance, the item featured in item box 203 may be a book, a movie, an article of clothing, and/or any other type of item. The price box 206 depicts the price of the item and indicates whether the item is in stock. For example, the price box 206 may contain the price for an electronic version of a book, hardcover version, paperback version and/or an audio version of the book.

The buy button 209 allows the browser 166 (FIG. 1) to submit a request to the electronic commerce system 116 (FIG. 1) to purchase the item depicted in the item box 203. The cart button 213 allows the browser 166 to submit a request to the electronic commerce system 116 to add the item in item box 203 to the user's shopping cart where the item may be purchased at a later time. For instance, the user may be able to continue shopping for other items on the electronic commerce system 116 and visit the shopping cart at a later time to purchase all of the items at once. The wish list box 216 allows the browser 166 to add the item in item box 203 to the user's wish list where the user may monitor the item to purchase at a desirable time. For instance, the price for the item in item box 203 may be too high for the user to purchase immediately. Adding the item to the wish list may allow the user to monitor the price of the item to purchase at a later time.

Turning now to FIG. 3, shown is an example of a network page 169 (FIG. 1), denoted herein as network page 169*b*, that may be viewed on client 106 (FIG. 1) according to various embodiments. In one embodiment, the network page 169*b* includes an item box 203 (FIG. 2), a price box 206 (FIG. 2), a buy button 209 (FIG. 2), a cart button 213 (FIG. 2) and a wish list button 216 (FIG. 2) as described above. Further, the network page 169*b* includes an incentives box 303 that depicts the incentives generated by the incentive generator 119 (FIG. 1).

In one embodiment, the incentives box 303 provides the user with a listing of potential delivery dates available if the item depicted in item box 203 is purchased. For instance, the user may receive no discount for selecting next day delivery, a 10% discount for selecting February 24 as a delivery date, a 15% discount for selecting February 25 as a delivery date, a 20% discount plus a free poster for selecting February 26 as a delivery date, and/or any other type of incentive for another delivery date. The incentives in the incentives box 303 may be provided to the user at any time a user is viewing a given item on a network page 169 from the electronic commerce system 116 (FIG. 1). For example, incentives may be listed in network pages such as product detail network pages 169, search result network pages 169, check-out pipeline network pages 169, or other types of network pages 169. The incentives may be presented in association with items viewed in an item detail page, with items presented as recommendations to a customer, or items presented in some other context. In one embodiment, the incentives are presented to provide options for shipping dates for an item during a checkout process.

Moving now to FIG. 4, shown is an example of a network page 169 (FIG. 1), denoted herein as network page 169*c*, that may be viewed on client 106 (FIG. 1) according to various embodiments. In one embodiment, the network page 169*c* includes an item box 203 (FIG. 2), a price box 206 (FIG. 2), a buy button 209 (FIG. 2), a cart button 213 (FIG. 2) and a wish list button 216 (FIG. 2) as described above. Further, the network page 169*c* includes an incentives box 403 that depicts the incentives generated by the incentive generator 119 (FIG. 1).

In one embodiment, the incentives box 403 provides the user with a listing of potential delivery dates available to multiple user shipping address 143 (FIG. 1) if the item depicted in item box 203 is purchased. For instance, if the user selects delivery to the home address, the user may receive no discount for selecting next day delivery, free gift wrapping for selecting February 24 as a delivery date, a 15% discount for selecting February 25 as a delivery date, a 20% discount plus free tickets for selecting February 26 as a delivery date, and/or any other type of incentive for another delivery date. The tickets may be for a movie, a sporting event, a theatrical presentation, and/or any other event that the user may prefer. Further, if the user selects delivery to the work address, the user may receive no discount for selecting next day delivery, a 15% off discount on a future purchase for selecting February 24 as a delivery date, a 20% discount for selecting February 25 as a delivery date, a 10% discount for selecting February 26 as a delivery date, and/or any other type of incentive for another delivery date.

The incentives depicted in incentives box 403 differ between delivery to the home address and delivery to the work address because of the difference in the locations given the approach used to generate the incentives. For instance, in one embodiment, the incentives are generated based on other previously scheduled deliveries to a location within a predefined area of the home address and/or work address, as described above. In another embodiment, the incentives box 403 may include incentives for delivery to other addresses, such as, for example, a son's shipping address, a daughter's shipping address, and/or other alternative shipping addresses. Further, the incentives in the incentives box 403 may be provided to the user at any time a user is viewing a given item on a network page 169 from the electronic commerce system 116 (FIG. 1). For example, incentives may be listed in network pages such as product detail network pages 169, search result network pages 169, check-out pipeline network pages 169, or other types of network pages 169. The incentives may be presented in association with items viewed in an item detail page, with items presented as recommendations to a customer, or items presented in some other context. In one embodiment, the incentives are presented to provide options for shipping dates for an item during a checkout process.

Figure 5:
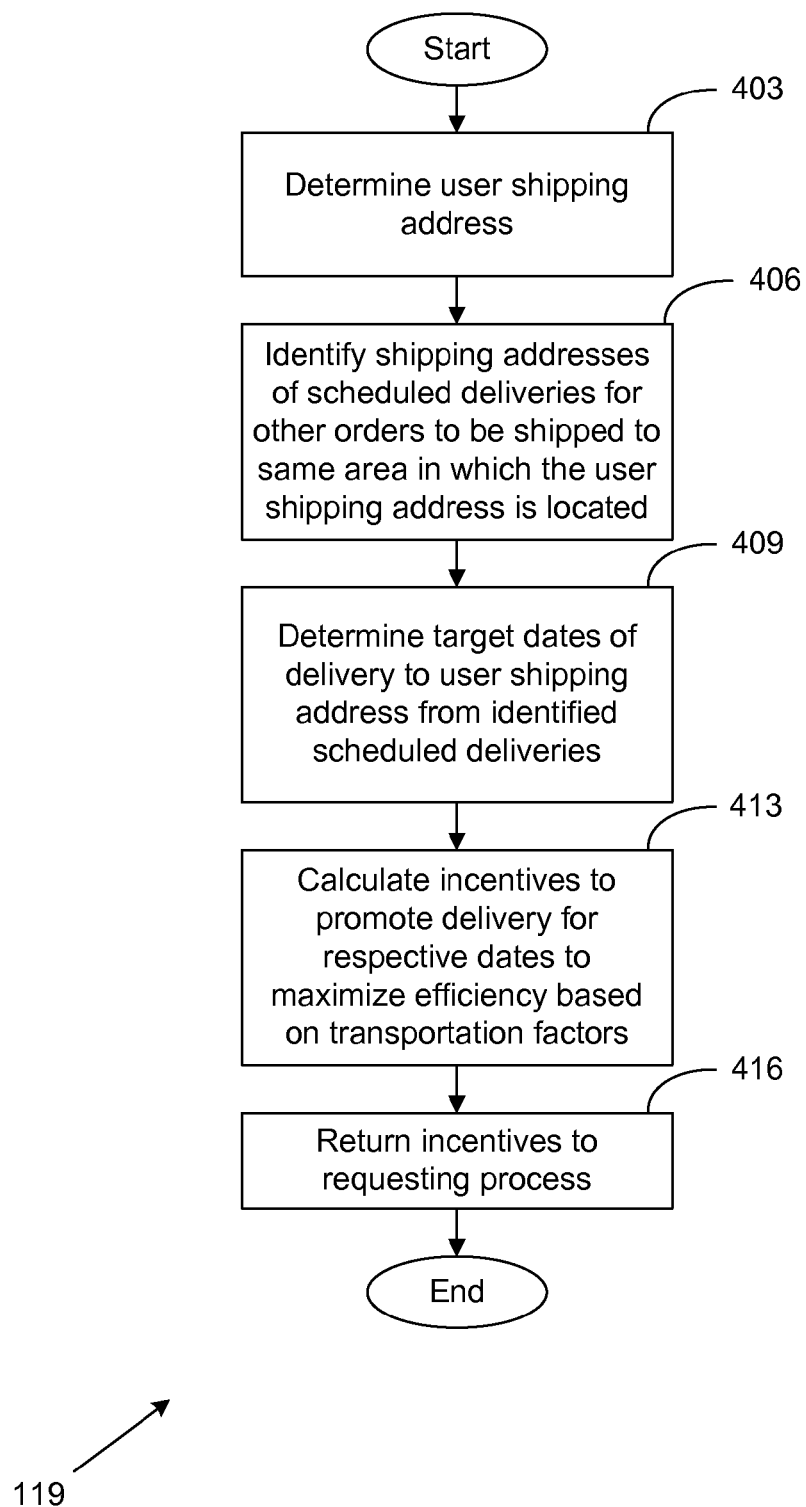
FIGS. 5 and 6 are flowcharts illustrating an example of functionality implemented as portions of an incentive generator executed in a computing device in the networked environment of FIG. 1 according to various embodiments of the present disclosure.

Referring next to FIG. 5, shown is a flowchart that provides one example of the operation of a portion of the incentive generator 119 (FIG. 1) according to various embodiments. It is understood that the flowchart of FIG. 5 provides merely an example of the many different types of functional arrangements that may be employed to implement the operation of the portion of the incentive generator 119 as described herein. As an alternative, the flowchart of FIG. 5 may be viewed as depicting an example of steps of a method implemented in the computing device 103 (FIG. 1) according to one or more embodiments.

According to one embodiment, the incentive generator 119 is a process that generates incentives to users to purchase items deliverable on specific days to promote shipping consolidation as described above. The incentive generator 119 is configured to respond to a request for incentives from a requesting process. For example, a requesting process may be a process that is generating a network page to present items to a user for possible purchase and/or a process that is presenting a network page to a user to select shipping options associated with a purchase, etc.

Beginning with box 403, the incentive generator 119 determines the user shipping address 143 (FIG. 1) that may be employed for the delivery of an item to a given customer. In one embodiment, the incentive generator 119 receives an indication of a given item for which an incentive is to be generated from a requesting process in the electronic commerce system 116 (FIG. 1). Also, the incentive generator 119 receives a user ID 136 (FIG. 1) of a current user that is interacting with the electronic commerce system 116 from the same requesting process and/or other process(es). The incentive generator obtains the user shipping address 143 associated with the user ID 136 from the data store 113 (FIG.

1). Note that the user shipping address 143 and/or other identifying information will have been provided by a user on a prior occasion or may be entered by a user to set up a user account when they first interact with the electronic commerce system 116, as described above.

Next, in box 406, having determined the user shipping address 143, the incentive generator 119 identifies order(s) 154 (FIG. 1) for items that are scheduled to be delivered to customers at shipping addresses 156 (FIG. 1) that are located within a predefined area relative to the user shipping address 143 identified above. For instance, the incentive generator 119 may determine that the shipping address 156 associated with an order 154 is within a predefined area relative to the user shipping address 143 if the shipping address 156 associated with the order 154 is geographically located within a predefined radius of the shipping address 143. In a further embodiment, the incentive generator 119 may also identify order(s) 154 scheduled to be delivered to a shipping address 156 that are located along a shipping route to the user shipping address 143. For example, the incentive generator 119 identifies an order 154*c* if the user shipping address 143 is located on a previously scheduled route from a materials handling facility such as a fulfillment center to the previously scheduled order to shipping address 156*c* and/or located within a predefined area relative to the route from the materials handling facility to the destination 156*c*.

Next, in box 409, the incentive generator 119 determines the target delivery date(s) 159 (FIG. 1) of the identified order(s) 154 from box 406 to determine preferred delivery dates if the user were to purchase such items and elect to receive shipment of such items on such preferred delivery dates. In one embodiment, the incentive generator 119 gathers the target delivery date(s) 159 from the data store 113 for the respective orders 154. However, if the incentive generator 119 finds no order(s) 154 in box 406, the incentive generator 119 may respond to the requesting process by indicating that there are no incentives available for this instance.

Assuming that the incentive generator 119 identified at least one order 154 in box 406 and the respective target date(s) 159, the incentive generator 119, in box 413, then calculates one or more incentives to promote the purchase of an item and/or to encourage delivery of such an item on one or more dates. In one embodiment, the incentive generator 119 generates incentives to maximize shipping consolidation and/or shipping efficiency based on transportation factors, as discussed above. For instance, the incentive generator 119 analyzes the destination(s) 156, the delivery date(s) 159, and/or other transportation factors as described above to generate the incentives. Further, in one embodiment, the incentive generator maximizes shipping consolidation by scheduling deliveries of purchased items on a preferred date where the total amount of weight and/or volume scheduled to be delivered to a given area exceeds a shipping capacity threshold 160 (FIG. 1) as described above.

As an example, the incentive generator 119 may determine that the total amount of items scheduled for delivery to a given area on a given date is close to at least one of the shipping capacity thresholds 160. If at least one of the shipping capacity thresholds 160 is attainable, the incentive generator 119 may generate incentives for one or more users to purchase items to be delivered on this preferred date. Thus, the electronic commerce system 116 takes advantage of any discounted shipping rates provided by a transportation entity for bulk transport.

Furthermore, as another example to calculate incentives, the incentive generator 119 may identify two orders 154*a*/154*b* to shipping addresses 156*a*/156*b* located within a predefined area relative to a user shipping address 143. The first scheduled delivery to shipping address 156*a* may be located in substantially the same geographic location as the user shipping address 143 while the second scheduled delivery to shipping address 156*b* may be further away from the location of the user shipping address 143. Further, the target delivery date 159*a* of the first order 154*a* may occur at a later time than the target delivery date 159*b* of the second order 154*b*. For instance, the target delivery date 159*a* may be three days later than the target delivery date 159*b*. If the user selects the later target delivery date 159*b*, the electronic commerce system 116 can schedule delivery of the potential purchase order on a vehicle that is already scheduled to deliver to shipping address 156*a* that is located in substantially the same geographic location as the user shipping address 143, thereby saving transportation costs and/or other costs. To promote the user on client 106 to select the later target delivery date 159*a*, the incentive generator 119 generates incentives that are higher for selecting the preferred delivery date. For example, the incentives generated by the incentive generator 119 include item discounts, shipping discounts, item giveaways, and/or other types of incentives.

As another example, the incentive generator 119 may identify two orders 154*a*/154*b* that are scheduled to deliver to shipping addresses 156*a*/156*b* located in substantially the same geographic location as the user shipping address 143. However, the target delivery date 159*a* of the first order 154*a* may occur at a later time than the target delivery date 159*b* of the second order 154*b*. In this embodiment, the incentive generator 119 may generate incentives to entice the user to select a target delivery date 159*a* and/or 159*b* because a vehicle is already scheduled to deliver to a location substantially the same as the user shipping address 143. Further, the incentive generator 119 may provide little or no incentive for the user to select a delivery date that is not the target delivery dates 159*a* and/or 159*b*. For example, the incentives generated by the incentive generator 119 may include item discounts, shipping discounts, item giveaways, and/or other types of incentives.

Having calculated the incentives, the incentive generator 119 next returns the calculated incentives to the requesting process. For example, the incentive generator 119 may return the calculated incentives to the electronic commerce system 116 that may then include such incentives in a network page 169, for example, to be sent to the client 106 and rendered by the browser 166. In another embodiment, the incentive generator 119 may transmit the calculated incentives directly to the user on client 106 using other communication means such as, for instance, email and/or other means. Furthermore, in yet another embodiment, the communication returning incentives to the requesting process may include natural resources saved if the user takes advantage of the incentives generated such as, for instance, used fuel, avoided pollution, reduced carbon footprint, and/or other savings in natural resources. Additionally, the incentive generator 119 may also generate incentives for a plurality of user shipping address(es) 143 stored in the user account data 126 (FIG. 1), as described above.

Figure 6:
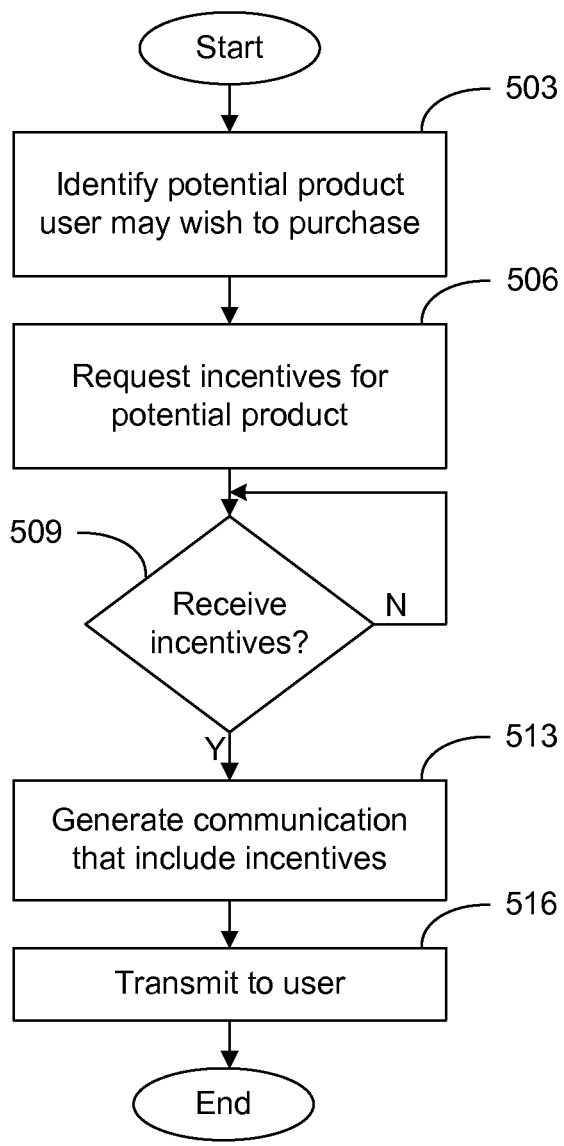

Referring next to FIG. 6, shown is a flowchart that provides one example of the operation of a portion of the electronic commerce system 116 (FIG. 1) according to various embodiments. It is understood that the flowchart of FIG. 6 provides merely an example of the many different types of functional arrangements that may be employed to implement the operation of the portion of the client side application 163 as described herein. As an alternative, the flowchart of FIG. 6 may be viewed as depicting an example of steps of a method implemented in the client 106 (FIG. 1) according to one or more embodiments.

In one embodiment, the electronic commerce system 116 is executed to facilitate the online purchase of items over a network 109 (FIG. 1). The electronic commerce system 116 is configured to perform back-end functions associated with the online purchase of items as well as generate network page(s) for the user accessing the electronic commerce system 116 to present the items available for purchase. In particular, the electronic commerce system 116 is also configured to execute the incentive generator 119 (FIG. 1) to obtain incentives to present to a user.

Beginning with box 503, the electronic commerce system 116 identifies a potential item that the user on client 106 may wish to view and/or purchase. For example, the electronic commerce system 116 may be in the process of generating a network page that will present an item that a user may select for purchase or that a user is in the process of purchasing. For example, such an item may be presented in the context of a search result network page or item detail page, or a checkout network page that facilitates specification of shipping options, etc. In one embodiment, the potential item may be made available to be depicted in item box 203 (FIG. 2), and/or any other way to access items on the electronic commerce system 116. Next, in box 506, the electronic commerce system 116 transmits a request to the incentive generator 119 (FIG. 1) for incentives to promote the potential purchase of the item identified in box 503 and, at the same time, potentially provide for greater consolidation of shipments as described above. In one embodiment, the generated incentives may be shipping discounts, item discounts, item giveaways, item rebates, cash back, services, coupons and/or any other type of incentive whether related or unrelated to the potential purchase of the item.

Next, in box 509, the electronic commerce system 116 waits to receive the incentives from the incentive generator 119. In one embodiment, the electronic commerce system 116 may not request the incentives from the incentive generator 119 until the user has been shopping and/or browsing for products in the electronic commerce system 116 for a threshold period of time. For instance, the browsing history 146 (FIG. 1) may record a total number of web page views associated with a particular item in the electronic commerce system 116, that occur over time.

Also, an inactivity timeout period may be associated with the electronic commerce system 116 in the event that the electronic commerce system 116 does not receive the requested information from the incentive generator 119. If the inactivity timeout period expires, then the electronic commerce system 116 may proceed without the incentives given that it may need to timely send a network page 169 to a client 106 in response to a request from the client 106.

Upon receiving the incentives, the electronic commerce system 119 then generates a communication such as a network page 169 that may be rendered by the browser 166 (FIG. 1) that includes the received incentives, as shown in box 513. Alternatively, the incentives may be communicated to the client 106 via email or other approach. In one embodiment, the electronic commerce system 119 may present the received incentives in a chart, a table, a calendar, and/or any other way to present organized data. For example, the organized data may then be rendered by the browser 166 and depicted in the incentives box 303 (FIG. 3) and/or incentives box 403 (FIG. 4). Finally, in box 516, the communication generated by the electronic commerce system 116 in box 513 is transmitted to the user. As an example, the incentives organized into a calendar is depicted on the network page(s) 169 (FIG. 1) and displayed by the display screen 173 (FIG. 1). Further, in another embodiment, the electronic commerce system 119 may include in the communication an amount of natural resources saved in terms of an amount of fuel or other resources saved by taking advantage of the incentives, as discussed above.

Figure 7:
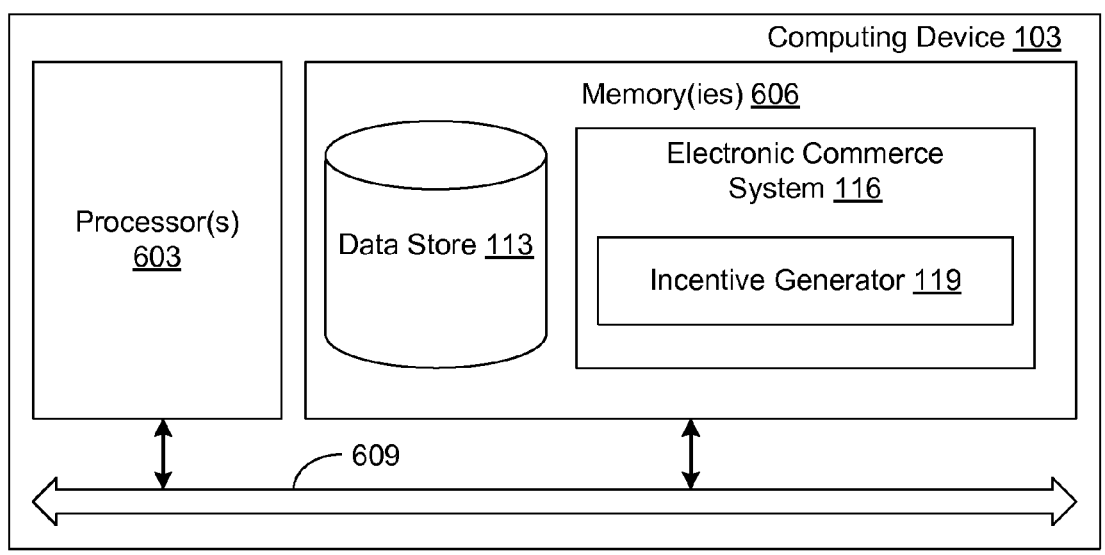
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the electronic commerce system 116, the incentive generator 119, and potentially other applications. Also stored in the memory 606 may be a data store 113 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the electronic commerce system 116, the incentive generator 119, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4 and 5 show the functionality and operation of an implementation of portions of the incentive generator 119 and a portion of the electronic commerce system 116. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 116 and the incentive generator 119, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein, when executed, the program causes the at least one computing device to at least:

generate one or more network pages associated with an electronic commerce system through which one or more items can be at least one of purchased, leased, or rented;

transmit the one or more network pages to a plurality of client devices;

monitor one or more interactions with the electronic commerce system by the plurality of client devices via the one or more network pages;

generate user interaction data based at least in part on the one or more interactions with the electronic commerce system;

establish a unique connection with a particular client device of the plurality of client devices;

determine at least one shipping address of a user account associated with the electronic commerce system and the particular client device of the plurality of client devices;

identify at least one previously scheduled order of at least one item to be delivered to at least one location within a predefined area relative to the at least one shipping address, the at least one previously scheduled order being associated with at least one other user account, the at least one other user account being associated with the electronic commerce system and at least one other client device of the plurality of client devices, the at least one previously scheduled order being identified via the interaction data;

determine an amount of environmental natural resources saved for individual ones of a plurality of potential dates of delivery to the at least one shipping address that maximize shipping consolidation;

generate, in response to an analysis of the interaction data, at least one incentive for the individual ones of the plurality of potential dates of delivery to the at least one shipping address that maximize shipping consolidation, the at least one incentive being generated based at least in part on a destination of the at least one previously scheduled order, at least one target delivery date of the at least one previously scheduled order, and at least one shipping capacity threshold, and the at least one incentive comprising at least one of an item discount, a shipping discount, or an item giveaway;

generate at least one modified network page by modifying at least one network page of the one or more network pages to include an indication of the at least one incentive, the amount of environmental resources saved for the individual ones of the plurality of potential dates of delivery, and the plurality of potential dates of delivery; and transmit the at least one modified network page to the particular client device of the plurality of client devices that is associated with the user account.

2. A system, comprising:

a memory; and at least one computing device in data communication with the memory, the at least one computing device being configured to at least;

generate one or more network pages including one or more items associated with an electronic commerce system;

transmit the one or more network pages to a plurality of client devices;

monitor one or more interactions with the one or more network pages by the plurality of client devices;

generate user interaction data based at last in part on the one or more interactions with the one or more network pages;

establish a unique connection with a particular client device of the plurality of client devices;

determine at least one shipping address of a user account associated with the electronic commerce system and the particular client device of the plurality of client devices;

identify at least one previously scheduled order to be shipped to at least one destination, the at least one destination located within a predefined area relative to the at least one shipping address associated with at least one other user account, the at least one other user account being associated with the electronic commerce system and at least one other client device of the plurality of client devices, and the at least one previously scheduled order being identified via the user interaction data;

determine at least one date for delivery of at least one item to the at least one shipping address to maximize shipment consolidation of the at least one previously scheduled order and the at least one item on the at least one date;

generate, in response to an analysis of the user interaction data and prior to receiving a selection to begin a transaction process for the at least one item from the client device, at least one incentive to promote delivery of the at least one item to the at least one shipping address on the at least one date;

generate a modified network page by modifying a network page of the one or more network pages to include an indication of the at least one incentive and the at least one date for delivery; and transmit the modified network page to the particular client device of the plurality of client devices that is associated with the user account.

3. The system of claim 2, wherein the modified network page including the at least one incentive is generated in response to the at least one item being viewed a threshold number of times.

4. The system of claim 2, wherein the at least one incentive comprises at least one of an item discount, a shipping discount, or an item giveaway.

5. The system of claim 2, wherein the at least one incentive is generated in response to receiving a request from a requesting process for the at least one incentive for the at least one item.

6. The system of claim 2, wherein the at least one incentive is determined based at least upon the at least one destination for the at least one previously scheduled order, a target delivery date for the at least one previously scheduled order, or a shipping capacity threshold.

7. The system of claim 2, wherein the at least one computing device is further configured to at least calculate a reduction in a carbon footprint resulting from using the at least one incentive that has been generated.

8. The system of claim 2, wherein the modified network page further includes an amount of an environmental resource saved by utilizing the at least one incentive.

9. The system of claim 2, wherein the at least one computing device is further configured to at least identify a destination shipping address associated with the at least one previously scheduled order, the destination shipping address being located along a shipping route to the at least one shipping address of the user.

10. The system of claim 2, wherein the at least one incentive is configured to reduce at least one shipping cost.

11. A method, comprising:

generating, via at least one of one or more computing devices, a plurality of network pages associated with an electronic commerce system;

transmitting, via at least one of the one or more computing devices, the plurality of network pages to a plurality of client devices;

monitoring, via at least one of the one or more computing devices, one or more interactions with the plurality of network pages by the plurality client devices;

generating, via the at least one of the one or more computing devices, user interaction data based at least in part on the one or more interactions with the electronic commerce system;

establishing, via the at least one of the one or more computing devices, a unique connection with a particular client device of the plurality of client devices;

gathering, via at least one of the one or more computing devices, at least one shipping address associated with a user account associated with the electronic commerce system and the particular client device;

identifying, via at least one of the one or more computing devices, at least one previously scheduled order to be delivered to a destination, the destination being located within a predefined area relative to the at least one shipping address, the at least one previously scheduled order being associated with another user account associated with the electronic commerce system and at least one other client device of the plurality of client devices, and the at least one previously scheduled order being identified via the user interaction data;

in response to an analysis of the user interaction data, generating, via at least one of the one or more computing devices and prior to receiving a request to initiate an order for delivery of at least one item from the client device, at least one incentive to promote selection of a prospective delivery date when ordering the at least one item, wherein the prospective delivery date is the same as a target delivery date of the at least one previously scheduled order, and the at least one incentive maximizes a shipping efficiency;

automatically modifying, via at least one of the one or more computing devices, at least one network page of the plurality of network pages to include an indication of the at least one incentive and the prospective delivery date; and transmitting, via at least one of the one or more computing devices, the modified at least one network page to the particular client device.

12. The method of claim 11, wherein the at least one incentive is generated, via at least one of the one or more computing devices, after the network page associated with at least one item has been viewed via the client device a threshold number of times.

13. The method of claim 11, wherein the at least one incentive is generated, via at least one of the one or more computing devices, based at least in part on the destination of the at least one previously scheduled order, the target delivery date of the at least one previously scheduled order, or a shipping capacity threshold.

14. The method of claim 11, wherein the particular client device is a mobile device.

15. The method of claim 11, wherein the at least one incentive comprises at least one of an item discount, a shipping discount, or an item giveaway.

16. The method of claim 11, further comprising communicating, via at least one of the one or more computing devices, the at least one incentive via an email.

17. The method of claim 11, further comprising communicating, via at least one of the one or more computing devices, an amount of an environmental resource saved by using the at least one incentive.

18. The method of claim 11, further comprising calculating, via at least one of the one or more computing devices, a reduction in a carbon footprint resulting from using the at least one incentive that has been generated.

19. The method of claim 11, further comprising identifying, via at least one of the one or more computing devices, at least one destination address associated with the at least one previously scheduled order, the at least one destination address being located along a shipment route to the at least one shipping address.

20. The method of claim 11, wherein the at least one incentive is configured, via at least one of the one or more computing devices, to reduce at least one shipping cost.

21. The non-transitory computer-readable medium of claim 1, wherein a first incentive is generated for a first potential date and a second incentive is generated for a second potential date, the first incentive being greater than the second incentive.

22. The system of claim 2, wherein determining the at least one date for delivery further comprises determining a first date of delivery and a second date of delivery, the first date of delivery having a greater degree of consolidation than the second date of delivery.

* * * * *